Figure 1:
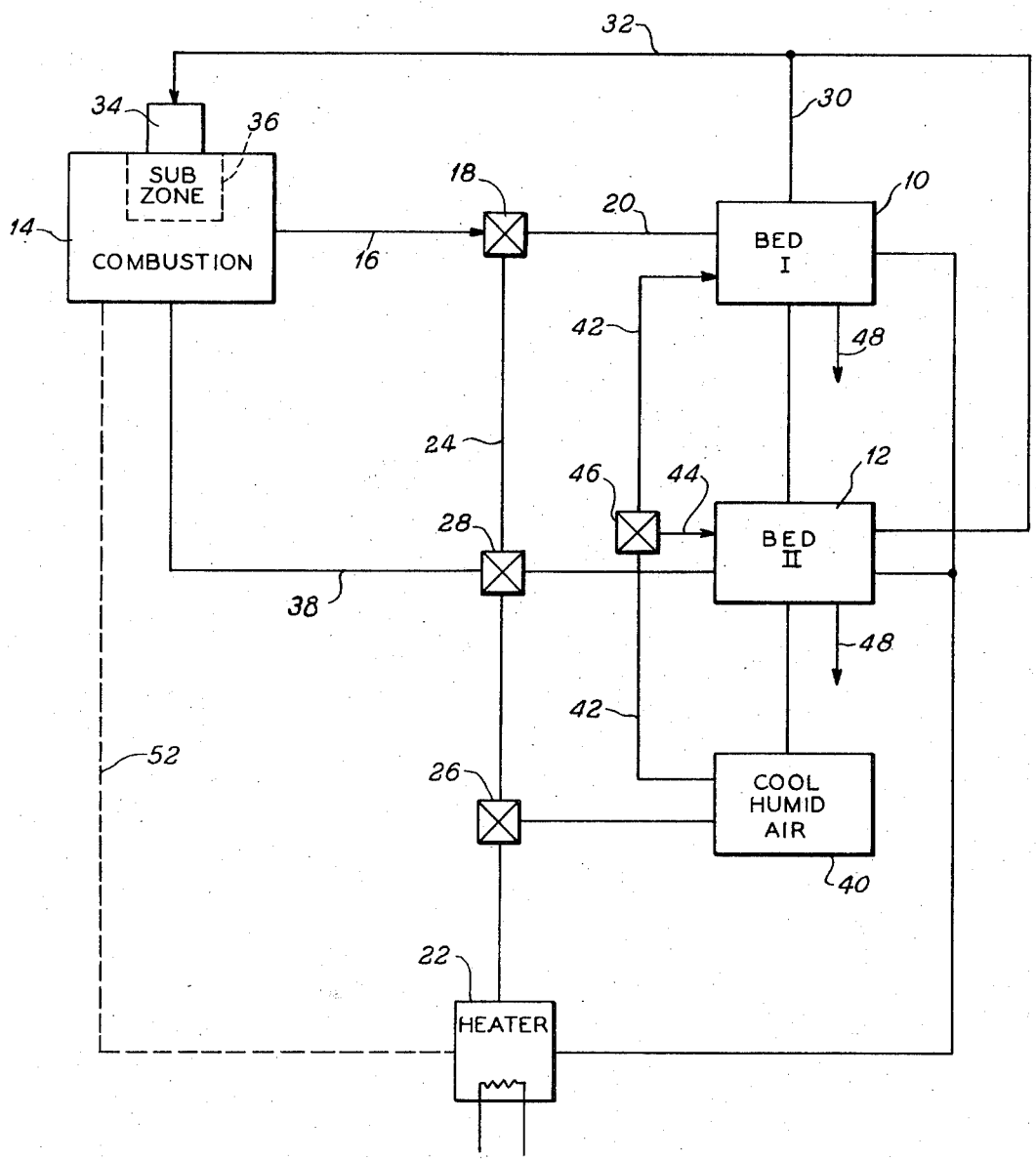

United States Patent [19]
Gidaspow

[11] 3,860,690
[45] Jan. 14, 1975

[54] SUPPRESSION OF NITRIC OXIDE

[75] Inventor: Dimitri Gidaspow, Chicago, Ill.

[73] Assignee: Institute of Gas Technology, Chicago, Ill.

[22] Filed: Nov. 3, 1971

[21] Appl. No.: 195,375

[52] U.S. Cl. ................ 423/239, 423/212, 423/351, 423/579, 60/279
[51] Int. Cl. .......................................... B01d 53/34
[58] Field of Search .......... 423/235, 239, 400, 405, 423/278, 279, 212, 351, 213.5, 579; 60/274, 210

[56] References Cited
UNITED STATES PATENTS

| | | | |
|---|---|---|---|
| 2,031,410 | 2/1936 | Fulweiler | 423/219 |
| 3,154,383 | 10/1964 | Froning et al. | 423/573 |
| 3,382,033 | 5/1968 | Kitagawa | 423/239 |
| 3,645,098 | 2/1972 | Templin et al. | 423/213 X |

FOREIGN PATENTS OR APPLICATIONS

| | | | |
|---|---|---|---|
| 16,068 | 7/1908 | Great Britain | 423/400 |
| 166,095 | 9/1920 | Great Britain | 423/400 |

*Primary Examiner*—Earl C. Thomas

[57] ABSTRACT

A method and system for suppressing nitric oxide in waste exhaust streams from combustion zones by delivering small amounts of the nitric oxide in a relatively fast moving waste exhaust stream to a zone having a regenerated salt present on a sorbent material where said nitric oxide is collected by forming a complex with said salt. A heated regenerating gas stream decomposes the complex, and a relatively slow moving stripping stream carries away larger amounts of said nitric oxide to a place in the combustion zone having elevated temperatures sufficiently high to decompose the nitric oxide and form nitrogen and oxygen. The regenerating stream converts the sorption zone to a regenerated zone so that a subsequent waste exhaust stream can be moved through the cycle. Purified exhaust streams are carried away from the zones undergoing regeneration and are discharged into the atmosphere. A stream of humid, cooled gas purges the zone undergoing regeneration to prevent entrainment of gases and to also cool and hydrate said zone. The zones are mass exchangers which take the form of fixed beds or a rotary member having adjoining sections which move into the respective zones during rotation.

12 Claims, 2 Drawing Figures

SUPPRESSION OF NITRIC OXIDE

This invention relates to a method and system for suppressing nitric oxide in waste gas streams emitted from combustion of hydrocarbons and other fuels with air. The invention particularly relates to an improved method and system wherein nitric oxide is emitted from stationary sources such as a furnace and from mobile sources such as automobiles.

Nitric oxide is one of the most troublesome pollutants which challenges the well-being of our environment. Immense quantities of nitric oxide are dumped into our atmosphere because of highly mechanized, motorized and industrialized society. The art has made many efforts to find an adequate solution to meet the problem of this very troublesome pollutant.

It is known that nitric oxide can be decomposed by catalytic combustion, for example. The problem of limited catalytic life, high temperature, expensive catalysts, space considerations, and relative inflexibility of utilizing such systems in automobiles limits the desirability of this approach. The problem of the great amounts of nitric oxide emitted only from automobiles makes it evident that a truly efficient and reliable system is needed to meet the problems created by these great nitric oxide producers. Hydrocarbon combustion furnaces and internal combustion engines are the most common and the most serious sources of pollution with respect to nitric oxide. The art would readily concede that an efficient mass exchanger for removing nitric oxide from waste exhaust streams would be highly desirable. The art would further recognize the great advantages of providing a regenerative mass exchanger which could readily handle the problems of large amounts of nitric oxide removal, and which could efficiently be regenerated to further process subsequent streams containing large amounts of nitric oxide.

The regenerative sorption of nitric oxide is a particularly attractive approach, providing serious limitations to its successful practice can be overcome, and providing that such procedure can attain efficient levels of operation. Reliable sorption means would have to be devised that could successfully remove substantial amounts of nitric oxide. Since any sorption system will sooner or later exhaust its capacity for absorbing nitric oxide, usually sooner, it is essential that an efficient regenerative system be devised which can quickly and reliably regenerate the sorption means so that it again can absorb large amounts of nitric oxide.

One known sorption system for nitric oxide is an admixture of a carrier and a salt which forms a complex with the nitric oxide. Various salts which form such a complex are known, such as cobalt sulfate, nickel sulfate, manganese chloride, and others. One very successful salt which is known to form a complex with nitric oxide is ferrous sulfate. It would be particularly advantageous and desirable to utilize such a salt and carrier, such as alumina, as an efficient mass exchanger. It would be additionally desirable to use such a sorption means in an overall system wherein such a sorption means could be readily regenerated by freeing the nitric oxide from the salt, disposing of the freed nitric oxide efficiently, and generally preparing the sorption means for subsequent absorption of the nitric oxide.

It is accordingly one important object of the present invention to provide a method and system wherein a sorption means is used to efficiently absorb nitric oxide, and wherein the nitric oxide is liberated and disposed in an improved manner while the sorption means undergoes regeneration.

It is yet another important object of the present invention to provide a method and system for utilizing a mass exchanger as a sorption system for removing nitric oxide from common stationary and mobile offenders, such as furnaces and automobiles, while providing means for readily disposing of the absorbed nitric oxide and regenerating the sorption system at the same time.

Yet another important object of the present invention is to provide a method and system wherein economically available salts, such as ferrous sulfate, are combined in an improved manner with high surface area sorbent materials, such as alumina, to provide a sorption means which efficiently removes nitric oxide and which can efficiently be regenerated by removing said nitric oxide and thereby making the mixture of salt and carrier ready for a subsequent absorption step.

Still yet another important object of the present invention is to provide a system and method wherein different gas streams are directed to separate beds or to different sections of a moving body so that both sorption and regeneration can occur in an improved way.

Yet another object is to provide a system and method wherein relatively fast moving waste exhaust streams with small amounts of nitric oxide are delivered to a mass exchanger for improved sorption, and wherein a relatively slower moving stripping stream with larger amounts of nitric oxide leaves such sorption area while it is undergoing regeneration.

Still yet another important object of the present invention is to provide a system and method wherein waste exhaust streams from a combustion zone are directed to an improved sorption means to accumulate the nitric oxide therein, and wherein such greater amounts of nitric oxide are carried away in a stripping stream while regenerating the sorption means, said large amounts of nitric oxide being recirculated to a portion of the combustion zone wherein the nitric oxide is decomposed at elevated temperatures to nitrogen and oxygen.

Figure 2:
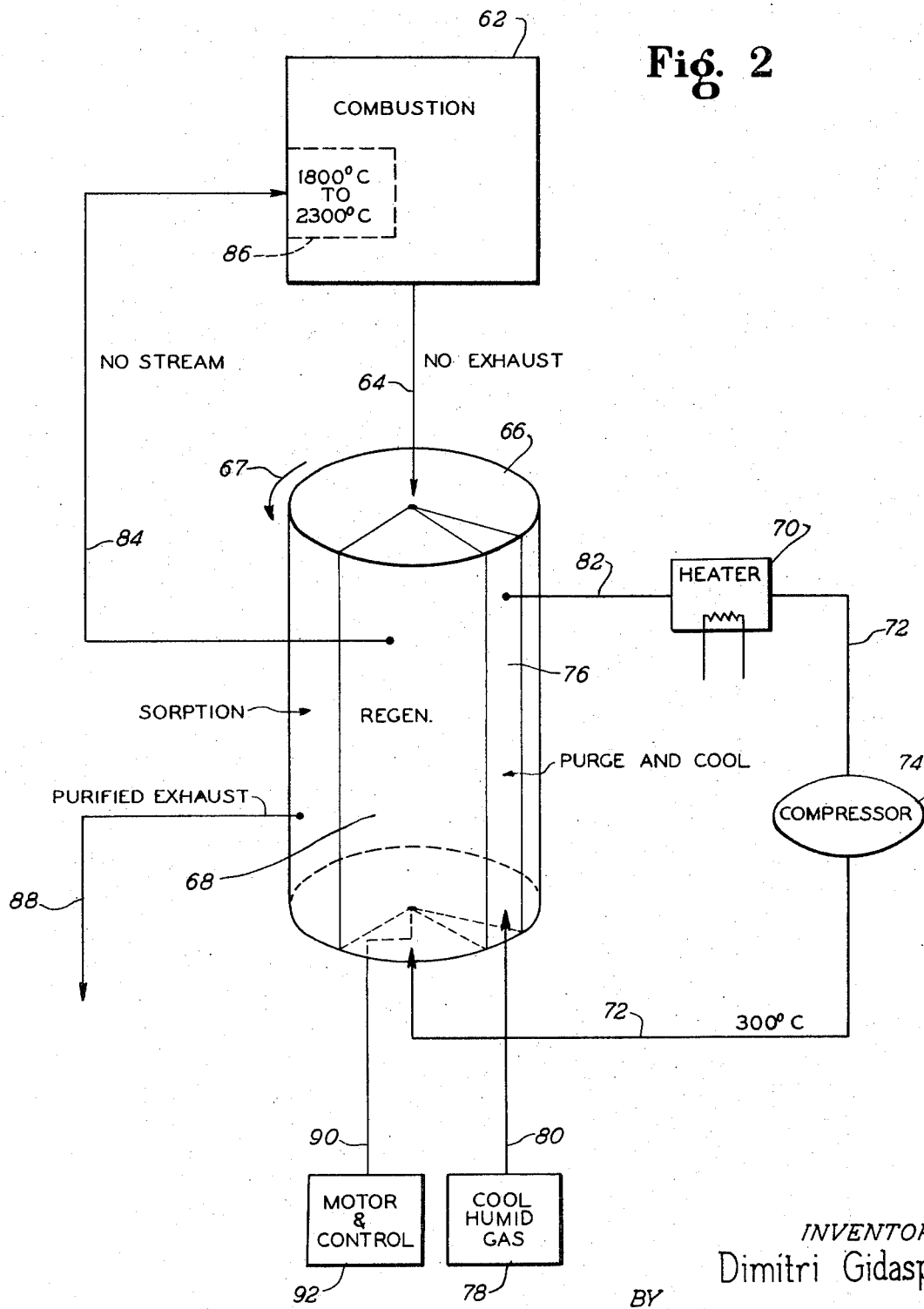

The objects which have been described can now be attained by the present invention, in addition to still other objects which will occur to practitioners from time to time by considering the following disclosure. Such disclosure includes drawings wherein:

FIG. 1 is a highly schematic view of an embodiment of the system which utilizes beds as the mass exchanger; and FIG. 2 is a highly schematic view of an alternative embodiment of the system which employs a rotary mass exchanger.

It is now provided that smaller amounts of nitric oxide in a waste gas stream from combustion of hydrocarbon moves relatively fast in carrying parts per million of nitric oxide to a sorption zone where said nitric oxide is accumulated as a complex with a salt that attracts said nitric oxide. The nitric oxide and salt complex is of the type which is readily decomposed by moderate temperature levels attained by heated gas streams being delivered to the sorption zone to decompose the complex and thereby regenerate said zone. The liberated nitric oxide is present in larger amounts in a relatively slower moving stripping stream which carries such nitric oxide back to a sub zone of the combustion area having temperatures high enough to decompose the nitric oxide to nitrogen and oxygen. The preferred embodiment provides delivering a stream of cool, humid gas such as air to purge the zone while it is undergoing regeneration to thereby prevent entrainment of any gases. The cool, humid air also cools and hydrates the zone in the regeneration step.

The use of a ferrous salt requires a reducing atmosphere during the regeneration step. It is known that ferrous salts react with oxygen and water, as well as with nitric dioxide which may be occasionally present in the exhaust to form ferric compounds. It is also known that the complex with sorbed nitric oxide can be regenerated to the active ferrous state by reducing gases such as hydrogen and carbon monoxide at temperatures of about 400° C. or lower if catalysts are used. Accordingly, an alternative embodiment provides regeneration of the sorbed complex with reducing gases. Such gases may include partially burned fuel or reformed fuel, that is, fuel reacted with water to form hydrogen. Use of some other salts to form the complex, such as cobalt salts, does not require a reducing atmosphere during regeneration.

The mass exchanger may take the form of separate beds of salt and carrier which are alternately selected to undergo respective sorption and regeneration. A first bed or zone may receive waste gas streams with nitric oxide from the combustion zone in the sorption step, while a second zone or bed which has previously received the waste gas stream undergoes regeneration by a heated regenerating gas stream. A mass exchanger of this type is, therefore, continually operating to both absorb nitric oxide in the waste stream, and to release such nitric oxide in preparation for subsequent sorption. Purging, cooling and hydration occurs during regeneration to better prepare the zone for subsequent sorption. The liberated nitric oxide is continually recirculated to a "hot spot" of the stationary or mobile combustion source for conversion to harmless nitrogen and beneficial oxygen.

The mass exchanger may also be in the preferred embodiment of a rotary mass exchanger. Sections of such sorption body are continually exposed to a delivery of waste exhaust streams with the nitric oxide, and another section is continually exposed to a heated, regenerating stream for liberating said nitric oxide. Another section is preferably exposed to the purging, cooling and hydrating stream of cool, humid gas.

The sorption zone contains a salt which forms a complex with nitric oxide such as ferrous sulfate, cobalt sulfate, nickel sulfate, or manganese chloride. In the preferred form such a salt is distributed on a high surface area sorbent such as alumina (De Gussa), silica gel, clay, diatomaceous earth, or the like.

The salt and nitric oxide complex can be decomposed by relatively moderate temperature levels of from about 150° C to about 400° C. The regeneration step leaves the nitric oxide complex forming salt and the carrier in readiness for subsequent sorption.

One particularly preferred sorbent means or admixture includes a minor amount of ferrous sulfate and a major amount of silica gel. A further aspect of the preferred embodiment provides adding a small amount of a dessicant such as lithium chloride. The admixture of carrier and salt is preferably made by ball milling the mixture together to thereby attain both high surface area through small particles and good distribution of the salt throughout the carrier particles. Referring now to the diagrammatic showing of FIG. 1, a "fixed bed" system is illustrated in which a first bed 10 is provided together with a second bed 12 which alternately function as sorption and regeneration beds. A combustion zone 14, such as an internal combustion engine of an automobile, delivers waste exhaust stream at relatively fast velocities through line or duct means 16. A valve means 18 will first direct the stream to a regenerated bed 10 which becomes a sorption bed following uptake of nitric oxide from the waste exhaust stream which enters through line or duct means 20.

Following sorption, a regenerating, heated gas stream comes from a source 22, and moves through line or duct means 24, as directed by valve 26 and 28. The heated gas stream will then move through valve 18, line 20 and into bed 10 which now undergoes regeneration as nitric oxide is liberated.

The higher amounts of liberated nitric oxide move in a stripping stream through line or duct means 30 and into stripping stream line or duct means 32, and then through manifold 34 into a subzone 36 where elevated temperatures decompose the nitric oxide to nitrogen and oxygen. Such a subzone in an internal combustion engine would be the cylinder area.

While bed 10 is undergoing regeneration, a subsequent waste gas stream with smaller amounts of nitric oxide can be directed through line or duct means 38 through valve means 28 and into second bed or sorption zone 12. While sorption takes place in bed or zone 12, regeneration is occurring in zone or bed 10. As regeneration occurs in bed 10, cool humid gas is directed from source 40 through line or duct means 42 and into bed 10 to purge, cool and hydrate the bed. The cool, humid air is alternately moved through line 42 and branch line 44 by way of valve 46 into the second bed or sorption zone 12 to aid in regeneration of that bed while bed or zone 10 is undergoing sorption.

The larger amounts of liberated nitric oxide in the relatively slower velocity streams formed during regeneration will follow a path along line 32 for passage to the hot spot of the subzone in the combustion zone. The substantially purified waste exhaust gases are discharged from the beds or zones 10, 12 to the atmosphere by way of discharge line or duct means 48.

While a separate, independent heater 22 is shown for heating the regenerating gas stream, such a stream may be heated by the alternative means of passing from a combustion zone 14 into line 52 and into heater area 22. The heater 22 may be a burner or reformer when using a salt such as ferrous sulfate which degrades upon contact with air and moisture.

The system employing the preferred rotary mass exchanger is shown in the diagrammatic representation of FIG. 2. The combustion zone 62 delivers a waste exhaust stream at a relatively fast velocity with relatively small amounts of nitric oxide through line or duct means 64 into sorption section 66 which moves past the opening of line 64. The rotary mass exchanger rotates in the direction indicated by arrow 67. It is seen that the sorption of the rotary mass exchanger comprises a major portion of the volume of the rotary body member. At a given rotational velocity, a point requires the longest traversing time in completing its passage through the sorption portion or section. Such point requires a substantially shorter time to traverse the regenerating section 68. A heated, regenerating air stream comes from heater 70 and moves through line 72, and the delivery rate of such stream may be increased to selected rates by compressor 74.

The purge, cooling and hydrating section 76 is the smallest section of the rotary mass exchanger, and said traversing point would require the shortest time to move through said section. Cool, humid gas is delivered from source 78 through line 80 to the purged, cool and hydrating section, 76. The gas stream leaves this section through line 82 into heater, 70.

The liberated nitric oxide leaves the regenerating section or zone through line or duct means 84, and then enters high temperature subzone 86 of the combustion zone 62. Purified exhaust gas stream is discharged into the atmosphere from the sorption section or zone through line 88. The rotary mass exchanger is rotated by shaft 90 as turned by motor and control means 92.

When using a ferrous salt, the heater 70 may be replaced by a reactor which is burner having its fuel supply adjusted to produce incomplete combustion. Alternatively, the heater may be a reformer producing a source of hydrogen. In this way, the gases needed for regeneration can be made reducing.

The foregoing schematic representation should not be viewed as precisely depicting the points or locations where the various lines or duct means empty the stream into the rotary mass exchanger, or where such duct means pick up streams from such rotary mass exchanger. Practitioners may readily devise preferred placements for the openings of the duct means where they adjoin such rotary mass exchanger. For example, all the duct means may have substantially semicircular configurations or cross-sections, and such openings may adjoin the specified portions or sections at the opposite planar and parallel faces of the rotary body member. The practitioner may also desire to use thermally insulated sealing means between the various duct means, as well as bearing thermal seals between the duct openings and the faces of the rotary member. Appropriate arcuate duct openings may also be provided for placing such duct openings adjacent the continuous circumferential face of the rotary member.

By way of representative illustration, the sorption mixture can be formed by an admixture of 25 percent ferrous sulfate, 13 percent lithium chloride and 62 percent hydrated alumina, said ferrous sulfate and alumina being ball milled to fine particle size, held in place by a support screen, or the like. Such a rotary member is provided in a system for suppressing nitric oxide from an automobile combustion zone, for example. The waste gas stream with the nitric oxide leaves the combustion zone at temperatures of from about 25° C to about 200° C. The regenerating gas stream is heated from about 150° C to about 400° C. and moved to the regenerating section or zone of the rotary member. The liberated nitric oxide gas is moved in a stripping stream in larger amounts and at a slower velocity to the sub zone 86 where temperatures of at least about 1,800°C and up to about 2,300°C decompose the nitric oxide to nitrogen and oxygen.

The waste exhaust stream from an internal combustion engine may contain about 0.1 percent of nitric oxide by volume, and this nitric oxide accumulates in the sorption zone where it attains levels of at least about 3 percent by volume and even up to 5 percent by volume or more. The stripping stream with the liberated nitric oxide, therefore, represents a large increase in the nitric oxide content, say up to about 50-fold increase over the exhaust stream. It is desirable to attain such concentration levels in stripping streams when treating exhaust streams of various fuels, having nitric oxide levels from about 10 ppm to about 5,000 ppm. The slower moving stripping stream with the larger amount of nitric oxide results in a more efficient decomposition process in that such accumulated larger amounts of nitric oxide are decomposed at the hot spot or subzone or the combustion zone. A rotary mass exchanger having a surface area of about 15 square feet can be operated to remove about one half pound of nitric oxide per hour, which is a normal production level for automobiles. Practitioners may readily determine the residence time required for particular temperatures of the sub zone to effect decomposition for different concentrations of nitric oxide in the recirculating stream. It is estimated that residence times of as little as 0.01 second is sufficient to decompose from 1–2 percent nitric oxide at elevated temperatures of 2,500° K. The kinetics of decomposition may be determined by techniques known in the art. Equilibrium composition with nitric oxide increases with temperature, therefore, in general the decomposition should be carried out at lowest temperatures compatible with the largest residence time available in a particular system.

The claims of the invention are now presented.

What is claimed is:

1. A method for suppressing nitric oxide in exhaust streams from a hydrocabon combustion zone comprising delivering the exhaust stream with small amounts of nitric oxide to a zone containing a salt selected from the group consisting of a ferrous salt and a cobalt salt, said salt being supported on a high surface area sorbent material to accumulate said nitric oxide in large amounts as a nitric oxide complex salt to thereby form a sorption zone, regenerating said sorption zone with a regenerating gas stream having temperatures sufficiently high to decompose said nitric oxide complex salt to free the accumulated nitric oxide and thereby form a regenerated zone, recirculating large amounts of nitric oxide in a stream from the regenerated zone to a high temperature subzone of said combustion zone to decompose said recirculated large amounts of nitric oxide to nitrogen and oxygen and delivering a subsequent exhaust stream with small amounts of nitric oxide to said regenerated zone to again form a sorption zone and thereby repeat the cycle.

2. A method which includes the steps of claim 1 above, and which further includes the step of introducing a cool, humid gas to the zone undergoing regeneration to purge, cool and hydrate said zone.

3. A method which includes the steps of claim 1 above, wherein said salt is ferrous sulfate, and said carrier is alumina, said salt being a minor amount by weight of the combination of salt and carrier.

4. A method which includes the steps of claim 1 above wherein said subzone is a cylinder of an engine, and said stream containing large amounts of nitric oxide being delivered to said cylinder through an engine manifold.

5. A method which includes the features of claim 1 above, wherein said subzone is a portion of a furnace which develops the highest temperatures during combustion.

6. A method which includes the steps of claim 1 above, wherein said regenerating stream is heated by an ancillary source separate from and independent of said zone.

7. A method which includes the steps of claim 1 above, where said regenerating steam is heated by gases arriving from said combustion zone.

8. A method which includes the steps of claim 1 above, wherein separate beds function alternatively as such zones, said exhaust stream with small amounts of nitric oxide moving to a first bed to form a sorption zone, while a second bed is receiving a regenerating gas stream, and thereafter moving said exhaust stream with small amounts of nitric oxide to said second bed to form a sorption zone, while moving said regenerating stream to said first bed to form a regenerated zone.

9. A method which includes the steps of claim 1 above, wherein said zones are adjacent sections in a rotary mass exchanger, including the step of rotating said mass exchanger so that the exhaust stream with small amounts of nitric oxide is delivered to a sorbent section, while regenerating gas stream is delivered to a regenerating section, which was previously in said sorption zone.

10. A method which includes the steps of claims 9 above, and which further includes delivering a cool, humid gas to a purging, cooling and hydrating section which previously was in said regenerating zone.

11. A method which includes the steps of claim 10 above, wherein said exhaust stream with small amounts of nitric oxide is delivered at temperatures from about 25° C to about 200° C, said regenerating stream is delivered at temperatures of at least about 150° C, and wherein said sub zone has temperatures of at least 1,800° C.

12. A method which includes the steps of claim 1 above, wherein the small amounts of nitric oxide in said exhaust stream is present at levels of from 10 parts per million to 5,000 parts per million, said large amounts of nitric oxide and said stripping stream moving at substantially slower velocities so that said large amounts of nitric oxide reach levels of at least about 3 percent by volume of the stripping stream.

* * * * *